US012460100B2

(12) United States Patent
Wei et al.

(10) Patent No.: US 12,460,100 B2
(45) Date of Patent: Nov. 4, 2025

(54) POLYMER LATEX FOR THE PREPARATION OF AN ELASTOMERIC FILM HAVING EXCELLENT STRESS RETENTION PROPERTIES AND SOFTNESS

(71) Applicant: Synthomer Sdn. Bhd., Johor Darul Takzim (MY)

(72) Inventors: Zhenli Wei, Johor Darul Takzim (MY); Yi-Fan Goh, Johor Darul Takzim (MY); Zuraida Mohamad, Johor Darul Takzim (MY)

(73) Assignee: Synthomer Sdn. Bhd., Johor Darul Takzim (MY)

( * ) Notice: Subject to any disclaimer, the term of this patent is extended or adjusted under 35 U.S.C. 154(b) by 739 days.

(21) Appl. No.: 17/760,670

(22) PCT Filed: Sep. 18, 2020

(86) PCT No.: PCT/MY2020/000013
§ 371 (c)(1),
(2) Date: Mar. 15, 2022

(87) PCT Pub. No.: WO2021/054816
PCT Pub. Date: Mar. 25, 2021

(65) Prior Publication Data
US 2022/0332871 A1 Oct. 20, 2022

(30) Foreign Application Priority Data
Sep. 20, 2019 (MY) .......................... PI 2019005480

(51) Int. Cl.
*C08F 236/10* (2006.01)
*C08F 2/22* (2006.01)
*C08F 212/10* (2006.01)
*C08F 220/06* (2006.01)
*C08F 220/44* (2006.01)
*C08F 220/46* (2006.01)
*C08F 236/06* (2006.01)
(Continued)

(52) U.S. Cl.
CPC .............. *C09D 109/04* (2013.01); *C08F 2/22* (2013.01); *C08F 212/10* (2013.01); *C08F 220/06* (2013.01); *C08F 220/44* (2013.01); *C08F 220/46* (2013.01); *C08F 236/06* (2013.01); *C08F 236/10* (2013.01); *C08F 236/12* (2013.01); *C08L 9/04* (2013.01); *C08L 9/08* (2013.01); *C08L 13/02* (2013.01); *C08L 55/02* (2013.01); *C09D 109/08* (2013.01); *C09D 113/02* (2013.01); *C09D 125/10* (2013.01); *C09J 109/04* (2013.01); *C09J 109/08* (2013.01); *C09J 113/02* (2013.01); *C09J 125/10* (2013.01); *C08L 9/10* (2013.01); *C08L 25/10* (2013.01); *C08L 53/02* (2013.01); *C08L 53/025* (2013.01); *C09D 109/10* (2013.01)

(58) Field of Classification Search
CPC .... C08F 236/10; C08F 236/12; C08F 200/46; C08F 220/46; C08L 9/04; C08L 9/10; C08L 9/08; C08L 13/02; C08L 25/10; C08L 53/02; C08L 53/025; C08L 55/02; C09D 109/04; C09D 109/08; C09D 109/10; C09D 113/02; C09D 125/10; C09D 153/02; C09D 153/025; C09J 109/04; C09J 109/08; C09J 109/10; C09J 113/02; C09J 125/10
See application file for complete search history.

(56) References Cited

U.S. PATENT DOCUMENTS

| | | | |
|---|---|---|---|
| 4,065,423 A * | 12/1977 | Hen | ....................... C08F 236/06 524/822 |
| 5,750,618 A | 5/1998 | Vogt et al. | |

(Continued)

FOREIGN PATENT DOCUMENTS

| | | | |
|---|---|---|---|
| CN | 101613513 A | 12/2009 | |
| CN | 110072936 A | 7/2019 | |

(Continued)

OTHER PUBLICATIONS

International Search Report and Written Opinion for International Application PCT/MY2020/000013, dated Dec. 10, 2020, 10 pages.

(Continued)

*Primary Examiner* — Joseph S Del Sole
*Assistant Examiner* — David L Miller
(74) *Attorney, Agent, or Firm* — Buchanan Ingersoll & Rooney PC

(57) ABSTRACT

A polymer latex is described for the preparation of an elastomeric film obtained by free-radical emulsion polymerization of a mixture of ethylenically unsaturated monomers comprising:
a) 15 to 99 wt.-% of conjugated dienes;
b) 0 to 80 wt.-% of ethylenically unsaturated nitrile compounds;
c) 0 to 70 wt.-% of vinyl aromatic monomers;
the sum of ethylenically unsaturated nitrile compounds b) and vinyl aromatic monomers c) being 0.95 to 84.95 wt.-%
d) 0.05 to 10 wt.-% of ethylenically unsaturated acids wherein the ethylenically unsaturated acids comprise
d1) an ethylenically unsaturated acid comprising
an acid functional group; and
a spacer group separating the ethylenically unsaturated group and the acid functional group by at least 4 atoms; and
e) 0 to 65 wt.-% of co-polymerizable ethylenically unsaturated compounds,
wherein monomers a) to e) are as defined.

12 Claims, No Drawings

(51) Int. Cl.
    *C08F 236/12*     (2006.01)
    *C08L 9/04*     (2006.01)
    *C08L 9/08*     (2006.01)
    *C08L 13/02*     (2006.01)
    *C08L 55/02*     (2006.01)
    *C09D 9/04*     (2006.01)
    *C09D 109/04*     (2006.01)
    *C09D 109/08*     (2006.01)
    *C09D 113/02*     (2006.01)
    *C09D 125/10*     (2006.01)
    *C09J 109/04*     (2006.01)
    *C09J 109/08*     (2006.01)
    *C09J 113/02*     (2006.01)
    *C09J 125/10*     (2006.01)
    *C08L 9/10*     (2006.01)
    *C08L 25/10*     (2006.01)
    *C08L 53/02*     (2006.01)
    *C09D 109/10*     (2006.01)

(56) References Cited

U.S. PATENT DOCUMENTS

| | | | |
|---|---|---|---|
| 6,451,893 | B1 | 9/2002 | Tao |
| 7,730,554 | B2 | 6/2010 | Wang |
| 7,919,556 | B2 | 4/2011 | Koziski et al. |
| 11,230,621 | B2 | 1/2022 | Simpson et al. |
| 2005/0154122 | A1 | 7/2005 | Ota et al. |
| 2010/0152365 | A1* | 6/2010 | Han .................. C08L 13/02 525/333.2 |
| 2011/0224362 | A1 | 9/2011 | Westerman et al. |
| 2015/0218352 | A1* | 8/2015 | Enomoto ............ C08K 5/0025 525/218 |
| 2016/0257773 | A1 | 9/2016 | Obrecht et al. |
| 2017/0099889 | A1 | 4/2017 | Liou |
| 2017/0283599 | A1 | 10/2017 | Cha et al. |
| 2017/0327669 | A1 | 11/2017 | Ng et al. |
| 2017/0342242 | A1 | 11/2017 | Kato |
| 2019/0091898 | A1 | 3/2019 | Yamamoto et al. |
| 2019/0092891 | A1 | 3/2019 | Kells et al. |
| 2021/0054177 | A1* | 2/2021 | Kim ......................... C08K 3/06 |

FOREIGN PATENT DOCUMENTS

| | | | | |
|---|---|---|---|---|
| CN | 111788262 | A | 10/2020 | |
| EP | 0792891 | A1 | 9/1997 | |
| EP | 1063258 | A2 | 12/2000 | |
| JP | S52134695 | A | 11/1977 | |
| JP | 2003252935 | A | 9/2003 | |
| JP | 2021515069 | A | 6/2021 | |
| KR | 20110038992 | A | 4/2011 | |
| KR | 2019066151 | A * | 6/2019 | ............... C08J 5/02 |
| WO | 0021451 | A1 | 4/2000 | |
| WO | 2017209596 | A1 | 12/2017 | |
| WO | WO-2020130330 | A1 * | 6/2020 | ........... B29C 41/003 |

OTHER PUBLICATIONS

Office Action (Notice of Reasons for Refusal) issued Aug. 6, 2024, by the Japanese Patent Office in corresponding Japanese Patent Application No. 2022-517718 and an English translation of the Office Action. (10 pages).

Office Action (The Second Office Action) issued Apr. 18, 2024, by the National Intellectual Property Administration, P. R. China in corresponding Chinese Patent Application No. 202080065656.5 and an English translation of the Office Action. (9 pages).

Office Action (The First Office Action) issued Nov. 1, 2023, by the State Intellectual Property Office, P. R. China in corresponding Chinese Patent Application No. 202080065656.5 and an English translation of the Office Action. (14 pages).

Office Action (The Third Office Action) issued Aug. 28, 2024, by the State Intellectual Property Office, P. R. China in corresponding Chinese Patent Application No. 202080065656.5 and an English translation of the Office Action. (14 pages).

Office Action issued Dec. 23, 2024, by the Taiwanese Patent Office in corresponding Taiwanese Patent Application No. 109132394 and an English translation of the Office Action. (20 pages).

* cited by examiner

POLYMER LATEX FOR THE PREPARATION OF AN ELASTOMERIC FILM HAVING EXCELLENT STRESS RETENTION PROPERTIES AND SOFTNESS

CROSS-REFERENCE TO RELATED APPLICATION

This application is a National Phase application of International Application No. PCT/MY2020/000013, filed Sep. 18, 2020, which claims priority to and the benefit of Malaysian Application No. PI 2019005480, filed Sep. 20, 2019, the entire disclosure of each of which is incorporated herein by reference for all purposes.

FIELD OF THE INVENTION

The present invention relates to a polymer latex for the preparation of an elastomeric film showing excellent stress retention properties and softness, to such elastomeric films and articles comprising said elastomeric films, to latex compositions comprising said polymer latex and to methods for making articles using said film e.g. dip-molded articles.

BACKGROUND OF THE INVENTION

According to the present industry standard, elastomeric films, in particular in dip-molding applications, for example examination gloves, are made from compounds containing carboxylated acrylonitrile butadiene latices (XNBR). But such conventional XNBR lattices cannot be used for surgical gloves because gloves made from these conventional lattices have very poor stress retention properties and are very stiff in nature. Poor stress retention leads to poor fitting of the glove to the forearm part of a surgeon resulting possibly in cross-contamination.

Therefore, frequently natural latex surgical gloves are employed. But natural rubber may cause protein allergy issues. Other polymers such as polyisoprene or polychloroprene are also used for making surgical gloves. However, the processing costs for these materials are very high and the production is not environmental-friendly.

U.S. Pat. No. 6,451,893 relates to a zinc oxide free elastomer formulation comprising a nitrile butadiene latex, sulfur in amounts of 3.0 parts per 100 parts of nitrile rubber and sulfur vulcanization accelerators. Gloves made from these formulation exhibit improves stress retention properties. Sulfur and sulfur vulcanization accelerators particularly in the relatively high amounts may cause allergy issues.

WO 00/21451 discloses carboxylated nitrile rubber gloves having a high stress retention made using prevulcanized carboxylated nitrile latex with 2 to 6 wt.-% methacrylic acid.

US 2005/0154122 describes a two step polymerization process for making a dip-forming latex resulting in soft elastomeric films.

US 2017/0099889 relates to gloves showing improved stress retention made from a formulation comprising a carboxylated nitrile rubber latex which is crosslinked by aluminum ions. Aluminum ions are considered as a potential health hazard.

According to U.S. Pat. No. 7,730,554 gloves exhibiting improves stress retention can be made by a double dipping process using different XNBR lattices in the two dipping steps. Such a process is complicated and results in increased production costs.

Accordingly, it is one object of the present invention to provide a polymer latex that gives elastomeric films that have excellent stress retention properties and superior softness and such polymer latex can be used in a range of articles but in particular they are suitable for use in surgical glove as well as condom applications.

SUMMARY OF THE INVENTION

The present inventors have surprisingly found that an elastomeric film made from a polymer latex obtainable by free-radical emulsion polymerization of a mixture of ethylenically unsaturated monomers comprising:
a) 15 to 99 wt.-% of conjugated dienes;
b) 0 to 80 wt.-% of ethylenically unsaturated nitrile compounds;
c) 0 to 70 wt.-% of vinyl aromatic monomers;
the sum of ethylenically unsaturated nitrile compounds b) and vinyl aromatic monomers c) being 0.95 to 84.95 wt.-%
d) 0.05 to 10 wt.-% of ethylenically unsaturated acids wherein the ethylenically unsaturated acids comprise
d1) an ethylenically unsaturated acid comprising
an acid functional group; and
a spacer group separating the ethylenically unsaturated group and the acid functional group by at least 4 atoms; and
e) 0 to 65 wt.-% of co-polymerizable ethylenically unsaturated compounds,
wherein monomers a) to e) are different from each other and the weight percentages being based on the total monomers in the mixture exhibits improved stress retention properties and softness.

According to one aspect the present invention relates to a polymer latex obtainable by free-radical emulsion polymerization of a mixture of ethylenically unsaturated monomers comprising:
a) 15 to 99 wt.-% of conjugated dienes;
b) 0 to 80 wt.-% of ethylenically unsaturated nitrile compounds;
c) 0 to 70 wt.-% of vinyl aromatic monomers;
the sum of ethylenically unsaturated nitrile compounds b) and vinyl aromatic monomers c) being 0.95 to 84.95 wt.-%
d) 0.05 to 10 wt.-% of ethylenically unsaturated acids wherein the ethylenically unsaturated acids comprise
d1) an ethylenically unsaturated acid comprising
an acid functional group; and
a spacer group separating the ethylenically unsaturated group and the acid functional group by at least 4 atoms; and
e) 0 to 65 wt.-% of co-polymerizable ethylenically unsaturated compounds,
wherein monomers a) to e) are different from each other and the weight percentages being based on the total monomers.

According to a further aspect the present invention relates to the use of said polymer latex for the production of dip-molded articles or for coating or impregnating a substrate, preferably a textile or ceramic substrate.

According to a further aspect the present invention relates to a polymer latex composition comprising the polymer latex of the present invention, wherein monomer d) comprises an ethylenically unsaturated carboxylic acid and the composition further comprises an oxirane functional compound.

According to a further aspect the present invention relates to a compounded latex composition suitable for the production of dip-molded articles comprising the polymer latex or the polymer latex composition as defined above and optionally adjuvants selected from sulfur vulcanization agents, accelerators for sulfur vulcanization, crosslinkers, polyvalent cations and combinations thereof.

According to a further aspect the present invention relates to a method for making dip-molded articles by
a) providing a compounded latex composition as defined above;
b) immersing a mold having the desired shape of the final article in a coagulant bath comprising a solution of a metal salt;
c) removing the mold from the coagulant bath and optionally drying the mold;
d) immersing the mold as treated in step b) and c) in the compounded latex composition of step a);
e) coagulating a latex film on the surface of the mold;
f) removing the latex-coated mold from the compounded latex composition and optionally immersing the latex-coated mold in a water bath;
g) optionally drying the latex-coated mold;
h) heat treating the latex-coated mold obtained from step e) or f) at a temperature of 40° C. to 180° C., preferably 60° C. to 100° C.; and
i) removing the latex article from the mold.

Still a further aspect of the present invention relates to an elastomeric film made from the polymer latex, the polymer latex composition or the compounded latex composition of the present invention and to an article comprising said elastomeric film, being preferably selected from surgical gloves, examination gloves, condoms, catheters, industrial gloves, textile-supported gloves and household gloves.

DETAILED DESCRIPTION OF THE INVENTION

The polymer latex according to one aspect of the present invention is obtainable by free-radical emulsion polymerization of a mixture of ethylenically unsaturated monomers comprising:
a) 15 to 99 wt.-% of conjugated dienes;
b) 0 to 80 wt.-% of ethylenically unsaturated nitrile compounds;
c) 0 to 70 wt.-% of vinyl aromatic monomers;
  the sum of ethylenically unsaturated nitrile compounds b) and vinyl aromatic monomers c) being 0.95 to 84.95 wt.-%
d) 0.05 to 10 wt.-% of ethylenically unsaturated acids wherein the ethylenically unsaturated acids comprise
  d1) an ethylenically unsaturated acid comprising
    an acid functional group; and
    a spacer group separating the ethylenically unsaturated group and the acid functional group by at least 4 atoms; and
e) 0 to 65 wt.-% of co-polymerizable ethylenically unsaturated compounds,
wherein monomers a) to e) are different from each other and the weight percentages being based on the total monomers.

Conjugated diene monomers a) suitable for the preparation of the polymer latex according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene, 1,3-cyclohexadiene, myrcene, ocimene, and farnasene. 1,3-butadiene, isoprene and combinations thereof are the preferred conjugated dienes. 1,3-butadiene is the most preferred diene. Typically, the amount of conjugated diene monomer ranges from 15 to 99 wt.-%, preferably from 20 to 99 wt.-%, more preferred from 30 to 75 wt.-%, most preferred from 40 to 70 wt.-%, based on the total weight of monomers. Thus, the conjugated diene may be present in amounts of at least 15 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for the polymer latex.

Accordingly, the conjugated diene monomers can be used in amounts of no more than 95 wt.-%, no more than 90 wt.-%, no more than 85 wt.-%, no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, or no more than 56 wt.-%. A person skilled in the art will appreciate that any range between any of the explicitly disclosed lower and upper limit is herein disclosed.

Unsaturated nitrile monomers which can be used to make the particles of latex polymer (a) include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred. These nitrile monomers can be included in amounts from 0 to 80 wt.-%, preferably from 1 to 80 wt.-%, more preferred from 10 to 70 wt.-%, or 10 to 60 wt.-%, and more preferred from 15 to 50 wt.-%, even more preferred from 20 to 50 wt.-%, most preferred from 23 to 43 wt.-%, based on the total weight of ethylenically unsaturated monomers for the polymer latex.

Thus, the unsaturated nitrile may be present in amounts of at least 1 wt.-%, 5 wt.-%, at least 10 wt.-%, at least 12 wt.-%, at least 14 wt.-%, at least 16 wt.-%, at least 18 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for the polymer latex.

Accordingly, the unsaturated nitrile monomers can be used in amounts of no more than 80 wt.-%, no more than 75 wt.-%, no more than 73 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, or no more than 44 wt.-%. A person skilled in the art will appreciate that any range between any of the explicitly disclosed lower and upper limit is herein disclosed.

Representatives of vinyl-aromatic monomers (c) include, for example, styrene, α-methylstyrene, vinyltoluene, o-methylstyrene, p-methylstyrene, p-tert-butylstyrene, 2,4-dimethylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, vinyltoluene and vinylxylene, 2-vinylpyridine, 4-vinylpyridine and 1,1-diphenylethylenes and substituted 1,1-diphenylethylenes, 1,2-diphenylethene and substituted 1,2-diphenylethylenes. Mixtures of one or more of the vinyl-aromatic compounds may also be used. The preferred monomers are styrene and α-methylstyrene. The vinyl-aromatic compounds can be used in a range of from 0 to 70 wt.-%, preferably from 1 to 70 wt.-%, more preferred from 10 to 70 wt.-%, even more preferred from 15 to 60 wt.-%, even more preferred from 15 to 50 wt.-%, or from 0 to 25 wt.-%, more preferred from 0 to 15 wt.-%, and even more preferred from 0 to 10 wt.-%, based on the total weight of ethylenically unsaturated monomers for the polymer latex. Thus, the vinyl-aromatic compound can be present in an amount of no more than 60 wt.-%, no more than 50 wt.-%, no more than 40 wt.-%, 35 wt.-%, no more than 30 wt.-%, no more than 25 wt.-%, no more than 20 wt.-%, no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for the polymer latex. If the vinyl aromatic compound is present it may be present in amounts of at 1 wt.-%, at least 2 wt.-%, at least 5 wt.-%, at least 10 wt.-%, at least 15 wt.-%, at least 20 wt.-%, at least 25 wt.-%, at least 30 wt.-%, or at least 35 wt.-% based on the total weight of ethylenically unsaturated monomers for the polymer latex.

In the monomer mixture for the preparation of the polymer latex of the present invention the sum of ethylenically unsaturated nitrile compounds b) and vinyl aromatic monomers c) is 0.95 to 84.95 wt.-% based on the total monomers in the mixture. Thus vinyl-aromatic compounds may also be completely absent. In such a case ethylenically unsaturated nitrile compounds are mandatorily present and the latex may be considered as a XNBR latex. Alternatively, ethylenically unsaturated nitrile compounds may be completely absent. In such a case, vinyl aromatic monomers are mandatorily present and the latex particularly if as the preferred conjugated diene butadiene and as preferred vinyl aromatic monomer styrene is selected may be considered as a XSBR latex.

The monomer mixture for the preparation of the polymer latex of the present invention comprises 0.05 to 10 wt.-% of ethylenically unsaturated acids (d) wherein the ethylenically unsaturated acids comprise an ethylenically unsaturated acid (d1) comprising an acid functional group; and
a spacer group separating the ethylenically unsaturated group and the acid functional group by at least 4 atoms.

The acid functional group may be selected from carboxylic acid groups and phosphorous containing acid groups. Suitable phosphorous containing acid groups may be selected from phosphoric acid groups and phosphonic acid groups. Preferably, the acid functional group is selected from carboxylic acid groups.

The monomers d1) may be selected from compounds having the structure:

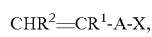

$CHR^2$=$CR^1$-A-X, wherein
$R^1$ is selected from H and $C_1$-$C_4$ alkyl,
$R^2$ is selected from H or -A-X;
A is a divalent spacer group separating the ethylenically unsaturated group and the functional group X by at least 4 atoms independently at each occurrence selected from:
—(C(O)—W)$_n$—Y—(O)$_m$—;  —(C(O)—W)$_n$—Y—O—C(O)—Y— and —(CH$_2$)$_k$—O—(C(O))$_p$—Y—(O)$_m$—
n, m, k and p are integers independently at each occurrence selected from 0 or 1;
W is —O— or —NR$^3$—;
$R^3$ is selected from H and $C_1$-$C_4$ alkyl;
Y is independently at each occurrence selected from optionally substituted linear, branched, cyclic or aromatic $C_2$ to $C_{30}$ divalent hydrocarbon or hetero hydrocarbon groups;
X is selected from —C(O)OH and —P(O)(OH)$_2$;
with the proviso that if X is —C(O)OH m is 0; or
-A-X is selected from —C(O)—O—(Y—C(O)—O)$_l$—H, wherein l is an integer from 2 to 10, preferably from 2 to 7; and mixtures thereof.

Preferably, d1) is selected from carboxy ($C_2$-$C_{30}$)alkyl (meth)acrylates, $C_7$ to $C_{15}$ fatty acids having a terminal ethylenically unsaturated group and mono (meth)acryloyloxy alkyl esters of dicarboxylic esters and more preferred from carboxy ($C_2$-$C_{12}$)alkyl (meth)acrylates and omega-(meth)acryloyloxy ($C_2$-$C_{12}$)alkyl succinates and most preferred from 2-(meth)acryloyloxyethyl succinate, 2-carboxyethyl acrylate and oligomers thereof having the structure $CH_2$=CH—C(O)—O—($C_2H_4$—C(O)—O)$_l$—H with l being an integer from 2 to 7 and mixtures thereof.

Suitable monomers d1) are commercially available from Solvay (Belgium) as Sipomer® β-CEA, Sipomer® PAM 100, Sipomer® PAM 200, Sipomer® PAM 300, Sipomer® PAM 4000, Sipomer® PAM 5000.

Typically, the amount of the ethylenically unsaturated acids (d) is from 0.05 to 10 wt.-%, particularly from 0.1 to 10 wt.-% or 0.05 to 7 wt.-%, preferably from 0.1 to 9 wt.-%, more preferred from 0.1 to 8 wt.-%, even more preferred from 1 to 7 wt.-%, most preferred 2 to 7 wt.-%, based on the total weight of the ethylenically unsaturated monomers for the polymer. Thus, the ethylenically unsaturated acid may be present in amounts of at least 0.01 wt.-%, at least 0.05 wt.-%, at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%. Likewise, the ethylenically unsaturated acid may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total weight of ethylenically unsaturated monomers for the polymer latex. A person skilled in the art will appreciate that any range defined by an explicitly disclosed lower limit and an explicitly disclosed upper limit is disclosed herewith.

The ethylenically unsaturated acid of d1) may be present in the mixture of ethylenically unsaturated monomers from 0.05 to 10 wt.-%, preferably 0.1 to 9 wt.-%, more preferred from 1 to 8 wt.-%, more preferred 1 to 6 wt.-%, even more preferred 2 to 5 wt.-%, most preferred 2 to 4 wt.-% based on the total monomers in the mixture. According to the present invention the ethylenically unsaturated acid of d1) may be the sole ethylenically unsaturated acid.

Thus, the ethylenically unsaturated acid (d1) may be present in amounts of at least 0.01 wt.-%, at least 0.05 wt.-%, at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%. Likewise, the ethylenically unsaturated acid (d1) may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total weight of ethylenically unsaturated monomers for the polymer latex. A person skilled in the art will appreciate that any range defined by an explicitly disclosed lower limit and an explicitly disclosed upper limit is disclosed herewith.

The monomer mixture for the preparation of the polymer latex of the present invention may additionally comprise ethylenically unsaturated acids (d2) that differ from the ethylenically unsaturated acids (d1). Suitable ethylenically unsaturated carboxylic acids (d2) or salts thereof may be selected from monocarboxylic acid and dicarboxylic acid monomers and their anhydrides and partial esters of polycarboxylic acids. It is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid, cis-cyclohexene-1,2-dicarboxylic acid, dimethylmaleic acid, bromomaleic acid, 2,3-dichloromaleic acid and (2-dodecen-1-yl) succinic acid. Examples of polycarboxylic acid partial esters include monomethyl maleate, monomethyl fumarate, monoethyl maleate, monoethyl fumarate, monopropyl maleate, monopropyl fumarate, monobutyl maleate, monobutyl fumarate, mono (2-ethyl hexyl) maleate, mono (2-ethyl hexyl) fumarate. Examples of other suitable ethylenically unsaturated acids (d2) include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. (Meth)acrylic acid, crotonic acid, itaconic acid, maleic acid, fumaric acid and combinations thereof are particularly preferred.

The ethylenically unsaturated acids (d2) may be present in the monomer mixture for the preparation of the polymer latex of the present invention in amounts to provide together with the amount of ethylenically unsaturated acids (d1) a total amount of ethylenically unsaturated monomers as disclosed above.

According to the present invention it is particularly preferred that the latex particles exhibit a gradient of the concentration of the functional group (a) with a higher concentration of functional groups (a) at the surface of the particles and a lower concentration within the bulk of the particles.

Further, the mixture of ethylenically unsaturated monomers for the polymer latex according to the present invention may include additional ethylenically unsaturated monomers that are different from the above-defined monomers. These monomers may be selected from
- e1) alkyl esters of ethylenically unsaturated acids;
- e2) hydroxyalkyl esters of ethylenically unsaturated acids;
- e3) amides of ethylenically unsaturated acids;
- e4) vinyl carboxylates;
- e5) alkoxyalkyl esters of ethylenically unsaturated acids
- e6) monomers having at least two ethylenically unsaturated groups;
- e7) ethylenically unsaturated silanes; and combinations thereof.

Vinyl carboxylate monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomer for use in the present invention is vinyl acetate. Typically, the vinyl ester monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for the polymer latex.

Alkyl esters of ethylenically unsaturated acids that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_8$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Methyl (meth)acrylate, ethyl (meth)acrylate, propyl (meth)acrylate, butyl (meth)acrylate, 2-ethylhexyl (meth)acrylate and combinations thereof are preferred.

Typically, the alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for the polymer latex.

The hydroxyalkyl esters of ethylenically unsaturated acids which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is 2-hydroxy ethyl(meth)acrylate. Typically, hydroxy alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for the polymer latex.

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for the polymer latex.

Amides of ethylenically unsaturated acids that can be used for the preparation of the polymer latex according to the present invention include acrylamide, methacrylamide, and diacetone acrylamide. The preferred amide monomer is (meth)acrylamide. In order to introduce functional groups that are capable of self-crosslinking upon heat treatment into the polymer particles of the present invention monomers comprising N-methylol amide groups may be employed. Suitable monomers are N-methylol (meth)acrylamide, N-methoxymethyl-(meth)acrylamide, N-n-butoxy-methyl-(meth)acrylamide, N-iso-butoxy-methyl-(meth)acrylamide, N-acetoxymethyl-(meth)acrylamide, N(-2,2-dimethoxy-1-hydroxyethyl) acrylamide. Typically, amides of ethylenically unsaturated acid can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers the polymer latex.

Suitable monomers having at least two ethylenically unsaturated groups (e6) may be selected from divinyl benzene and diacrylates and di(meth)acrylates. Examples are ethylene glycol di(meth)acrylate, hexanediol di(meth)acrylate, tripropylene glycol di(meth) acrylate, butanediol di(meth)acrylate, neopentyl glycol di(meth)acrylate, diethylene glycol di(meth)acrylate, triethylene glycol di(meth)acrylate, and dipropylene glycol di(meth)acrylate. The monomers having at least two ethylenically unsaturated groups are preferably selected from divinyl benzene 1,2-ethyleneglycol di(meth)acrylate, 1,4-butanediol di(meth)acrylate and 1,6-hexanediol di(meth)acrylate. Preferred monomers having at least two ethylenically unsaturated groups, are preferably selected from divinyl benzene, ethylene glycol dimethacrylate and 1,4 butanediol di(meth)acrylate. The amount of monomers having at least two ethylenically unsaturated groups may be less than 5 wt.-%, preferably less than 4 wt.-%, more preferred less than 3 wt.-%, even more preferred less than 2.5 wt.-%, even more preferred less than 2 wt.-%, even more preferred less than 1.5 wt.-% based on the total weight of monomers. The monomer mixture may be free of monomers e6).

Suitable silane monomer e7) may be selected from vinyl trialkoxysilanes, allyl trialkoxysilanes and 3-(meth)acryloxy propyl trialkoxysilanes. The amount of silane monomers e7) may be less than 5 wt.-%, preferably less than 4 wt.-%, more preferred less than 3 wt.-%, even more preferred less than 2.5 wt.-%, even more preferred less than 2 wt.-%, even more preferred less than 1.5 wt.-% based on the total weight of monomers. The monomer mixture may be free of monomers e7).

Method for the Preparation of the Polymer Latex of the Present Invention:

The polymer latex according to the present invention can be made by any emulsion polymerization process known to a person skilled in the art, provided that the monomer mixture as herein defined is employed. Particularly suitable is the process as described in EP-A 792 891.

In the emulsion polymerization for preparing the polymer latex of the present invention a seed latex may be employed. The seed latex is preferably separately prepared, and the emulsion polymerization is conducted in the presence of the separately prepared seed latex. The seed latex particles are preferably present in an amount of 0.01 to 10, preferably 1 to 5 parts by weight, based on 100 parts by weight of total ethylenically unsaturated monomers employed in the polymer latex including those for making the seed particles, such as the oxirane-functional latex particles (b). The lower limit of the amount of seed latex particles therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight. The upper limit of the amount can be 10, 9, 8, 7, 6, 5.5, 5, 4.5, 4, 3.8, 3.6, 3.4, 3.3, 3.2, 3.1 or 3 parts by weight. A person skilled in the art will understand that any range formed by any of the explicitly disclosed lower limits and upper limits is explicitly encompassed in the present specification.

The process for the preparation of the above-described polymer latex can be performed at temperatures of from 0 to 130° C., preferably of from 0 to 100° C., particularly preferably of from 5 to 70° C., very particularly preferably of from 5 to 60° C., in the presence of no or one or more emulsifiers, no or one or more colloids and one or more initiators. The temperature includes all values and sub-values therebetween, especially including 5, 10, 15, 20, 25, 30, 35, 40, 45, 50, 55, 60, 65, 70, 75, 80, 85, 90, 95, 100, 105, 110, 115, 120 and 125° C.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid) and inorganic peroxy compounds, such as hydrogen peroxide, sodium, potassium and ammonium peroxydisulfate, peroxycarbonates and peroxyborates, as well as organic peroxy compounds, such as alkyl hydroperoxides, dialkyl peroxides, acyl hydroperoxides, and diacyl peroxides, as well as esters, such as tertiary butyl perbenzoate and combinations of inorganic and organic initiators.

The initiator is used in a sufficient amount to initiate the polymerization reaction at a desired rate. In general, an amount of initiator of from 0.01 to 5, preferably of from 0.1 to 4%, by weight, based on the weight of the total polymer, is sufficient. The amount of initiator is most preferably of from 0.01 to 2% by weight, based on the total weight of the polymer. The amount of initiator includes all values and sub-values therebetween, especially including 0.01, 0.1, 0.5, 1, 1.5, 2, 2.5, 3, 4 and 4.5% by weight, based on the total weight of the polymer.

The above-mentioned inorganic and organic peroxy compounds may also be used alone or in combination with one or more suitable reducing agents, as is well known in the art. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. More preferred is the use of a proprietary sodium salt of an organic sulfinic acid derivative, such as Bruggolite® FF6 or Bruggolite® FF6M. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, Sodium alkyl esters of sulfonic acid, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 20, preferably from 0 to 10, more preferably from 0 to 5, wt.-%, based on the total weight of the monomers. The amount of surfactant includes all values and sub-values there between, especially including 0, 0.1, 0.5, 1, 2, 3, 4, 5, 6, 7, 8, 9, 10, 11, 12, 13, 14, 15, 16, 17, 18 and 19 wt.-%, based on the total weight of the monomer. According to one embodiment of the present invention, the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polysaccharides, and degraded polysaccharides, polyethylene glycol and gum arabic. The preferred protective colloids are carboxymethylcellulose, hydroxyethylcellulose and hydroxypropylcellulose. In general, these protective colloids are used in contents of from 0 to 10, preferably from 0 to 5, more preferably from 0 to 2 parts by weight, based on the total weight of the monomers. The amount of protective colloids includes all values and sub-values therebetween, especially including 1, 2, 3, 4, 5, 6, 7, 8 and 9 wt.-%, based on the total weight of the monomers.

The person skilled in the art will appreciate the type and amounts of monomers bearing polar functional groups, surfactants and protective colloids that are to be selected to make the polymer latex according to the present invention suitable for dip-molding applications. Thus, it is preferred that the polymer latex composition of the present invention has a certain maximum electrolyte stability determined as critical coagulation concentration of less than 30 mmol/l $CaCl_2$, preferably less than 25 mmol/l, more preferred less than 20 mmol/l, most preferred less than 10 mmol/l (determined for a total solids content of the composition of 0.1% at pH 10 and 23° C.).

If the electrolyte stability is too high, then it will be difficult to coagulate the polymer latex in a dip-molding process, with the result that either no continuous film of the polymer latex on the immersed mold is formed or the thickness of the resulting product is non-uniform.

It is within the routine of the person skilled in the art to appropriately adjust the electrolyte stability of a polymer latex. The electrolyte stability will depend on certain different factors, for example, amount and selection of monomers to be used for making the polymer latex, especially monomers containing polar-functional groups, as well as the selection and amount of the stabilizing system, for example, the emulsion polymerization process for making the polymer latex. The stabilizing system may contain surface-active agents and/or protective colloids.

A person skilled in the art is able, depending on the selected monomers and their relative amounts for making the polymer latex of the present invention, to adjust the stabilizing system in order to achieve an electrolyte stability according to the present invention.

Since there are so many different influences on the electrolyte stability, the adjustment is best made by trial and error experiments. But this can be easily done without any inappropriate effort using the test method for electrolyte stability, as disclosed above.

It is frequently advisable to perform the emulsion polymerization additionally in the presence of buffer substances and chelating agents. Suitable substances are, for example, alkali metal carbonates and hydrogen carbonates, alkali metal phosphates and pyrophosphates (buffer substances) and the alkali metal salts of ethylenediaminetetraacetic acid (EDTA) or hydroxyl-2-ethylenediaminetriacetic acid (HEEDTA) as chelating agents. The quantity of buffer substances and chelating agents is usually 0.001-1.0 wt.-%, based on the total quantity of monomers.

Furthermore, it may be advantageous to use chain transfer agents (regulators) in emulsion polymerization. Typical agents are, for example, organic sulfur compounds, such as thioesters, 2-mercaptoethanol, 3-mercaptopropionic acid and $C_1$-$C_{12}$ alkyl mercaptans, n-dodecylmercaptan and t-dodecylmercaptan being preferred. The quantity of chain transfer agents, if present, is usually 0.05-3.0 wt.-%, preferably 0.2-2.0 wt.-%, based on the total weight of the used monomers.

Furthermore, it can be beneficial to introduce partial neutralization to the polymerization process. A person skilled in the art will appreciate that by appropriate selections of this parameter the necessary control can be achieved.

Polymer Latex Composition:

The polymer latex composition of the present invention can be prepared by first making the polymer latex as described above wherein monomer d) comprises an ethylenically unsaturated carboxylic acid and then combining the obtained polymer latex with an oxirane functional compound. In the polymer latex composition of the present invention the carboxylic acid functional latex polymer of the present invention and the oxirane functional compound are present in relative amounts to provide a molar ratio of oxirane groups to carboxylic acid groups from 0.1 to 2, preferably from 0.1 to 1.5, more preferred from 0.2 to 0.9, most preferred from 0.3 to 0.6.

The oxirane functional compound may be selected from
i) a latex polymer, preferably a butadiene acrylonitrile latex polymer bearing a plurality of oxirane functional groups;

ii) monomeric or oligomeric compounds comprising at least two oxirane functional groups; and
iii) monomeric compounds, oligomeric or polymeric compounds that are not prepared be free-radical addition polymerization bearing at least one oxirane group and a functional group different from an oxirane group, said functional groups different from an oxirane group on different molecules of compound iii) are capable of reacting with each other.

The latex polymer i) may be selected from oxirane functional latex polymers as disclosed in WO 2017/209596.

Suitable monomeric or oligomeric compounds comprising at least two oxirane functional groups ii) may be selected from ethylene glycol diglycidyl ether, propylene glycol diglycidyl ether, poly (ethylene glycol) diglycidyl ether, poly(propylene glycol) diglycidyl ether, bisphenol-A diglycidyl ether, and combinations thereof.

Preferably, compound iii) is selected from oxirane functional di- or tri alkoxysilanes, more preferred from (3-glycidoxypropyl) trialkoxysilanes.

Without wanting to be bound by theory it is believed that when forming an elastomeric film from a latex composition comprising the carboxylated polymer latex of the present invention and an oxirane functional compound thermally labile beta-hydroxy ester linkages such as cross-links are formed. Upon application of thermal energy these labile beta-hydroxy ester linkages or cross-links my break up and subsequently reform again, with the result that such elastomeric films show self-healing properties and can be repaired and recycled providing an additional advantage to the present invention.

Compounded Latex Composition for the Production of Dip-Molded Articles:

The polymer latex of the present invention is particularly suitable for dip-molding processes. Therefore, the polymer latex or the polymer latex composition of the present invention is compounded to produce a curable polymer latex compound composition that can be directly used in dip-molding processes.

The compounded latex composition suitable for the production of dip-molded articles include the polymer latex or the polymer latex composition of the present invention and adjuvants selected from sulfur vulcanization agents, accelerators for sulfur vulcanization, crosslinkers, polyvalent cations and combinations thereof. The presence of multivalent cations, preferably ZnO, preferably in amounts of 0.5 wt.-% to 2.5 wt.-% of ZnO based on solid latex polymer of ZnO is preferred.

In particular the compounded latex composition may comprise 0 to 2.8 wt.-%, preferably 0.5 to 2.8 wt.-%, more preferred 1.0 to 2.0 wt.-%, most preferred 1.5 to 2.0 wt.-% sulfur and 0.0 to 2.8 wt.-%, preferably 1.0 to 2.0 wt.-%, more preferred 1.2 to 1.8 wt.-% of sulfur vulcanization agents and 0.5 wt.-% to 2.5 wt.-% of ZnO the weight percentages being based on solid latex polymer. If crosslinkers such as the oxirane functional compounds as discussed above are present sulfur vulcanization agents may be omitted.

To get reproducible good physical film properties, it is advisable to adjust the pH of the compounded polymer latex composition by pH modifiers to be in the range of pH 7 to 13, preferably 10.5 to 13, more preferred 11 to 12, for dipping to produce thin disposable gloves. For producing unsupported and/or supported reusable gloves, it is advisable to adjust the pH of the compounded polymer latex composition by pH modifiers to be in the range of pH 8 to 10, preferably 8.5 to 9.5. The compounded polymer latex composition contains the polymer latex of the present invention, optionally the pH modifiers, preferably ammonia or alkali hydroxides and optionally usual additives to be used in these compositions selected from antioxidants, pigments, $TiO_2$, fillers and dispersing agents.

Various other additives and ingredients can be added in order to prepare the latex composition of the present invention. Such additives include, for example: antifoams, wetting agents, thickeners, plasticizers, fillers, pigments, dispersants, optical brighteners, antioxidants, biocides and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfate. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Titanium dioxide ($TiO_2$), calcium carbonate and clay are the fillers typically used.

Method for Making Dip-Molded Articles:

In the method for making dip-molded latex articles according to the present invention, first, a clean mold having the desired shape of the final article is immersed in a coagulant bath comprising a solution of a metal salt. The coagulant is usually used as a solution in water, an alcohol or a mixture thereof. As specific examples of the coagulant the metal salts can be metal halides like calcium chloride, magnesium chloride, barium chloride, zinc chloride and aluminum chloride; metal nitrates such as calcium nitrate, barium nitrate and zinc nitrate; metal sulfates like calcium sulfate, magnesium sulfate, and aluminum sulfate; and acetic acid salts such as calcium acetate, barium acetate and zinc acetate. Most preferred are calcium chloride and calcium nitrate. The coagulant solution might contain additives to improve the wetting behavior of the former.

Thereafter, the mold is removed from the bath and optionally dried. The such treated mold is then immersed in the compounded latex composition according to the present invention. Thereby, a thin film of latex is coagulated on the surface of the mold. It is known in the art that the thickness of the thus dipped film may be influenced by the concentration of the compounded latex and/or the length of time that the salt-coated mold is in contact with the compounded latex. Alternatively, it is also possible to obtain the latex film by a plurality of dipping steps, particularly two dipping steps in sequence.

Thereafter, the mold is removed from the latex composition and optionally immersed in a water bath in order to extract, for example, polar components from the composition and to wash the coagulated latex film. Thereafter, the latex coated mold is optionally dried at temperature below 80° C.

Finally, the latex coated mold is heat-treated at a temperature of 40-180° C. in order to obtain the desired mechanical properties for the final film product. Then, the final latex film is removed from the mold. The duration of the heat treatment will depend on the temperature and is typically between 1 and 60 minutes. The higher the temperature, the shorter is the required treatment time.

The inventors of the present invention surprisingly discovered that the dip-molding process can be run more economically when employing the polymer latex composition of the present invention. Particularly, it was discovered that the duration between forming the compounded latex composition according to the present invention and performing the dip-molding step (maturation time) can be considerably reduced to 180 min or less, compared to compounds made from standard lattices that need a maturing time of well above 180 min.

Additionally, the inventors found that the temperature in the heat treatment step can be considerably reduced to be within a range of 40° C. to less than 120° C. without compromising the mechanical properties of the final dip-molded product. Conventional latices require temperature of 120° C. and above to achieve the desired mechanical properties. Thus, when employing the polymer latex of the present invention, the dip-molding process is less time-consuming and less energy-consuming, making it more economical.

The final heat-treated elastomeric film may have a tensile strength of at least about 7 MPa and an elongation at break of at least about 300%, preferably a tensile strength of at least about 10 MPa, an elongation at break of at least about 350%, more preferred a tensile strength of at least about 15 MPa and an elongation at break of at least about 400% and even more preferred a tensile strength of at least about 20 MPa and an elongation at break of at least about 500%. These mechanical properties were measured according ASTM D 6319. A suitable range for the stress retention is 35 to 80%, preferably 50 to 70%.

The dip-molding process of the present invention can be used for any latex article that can be produced by a dip-molding process known in the art. The article may be selected from health care devices formed from elastomeric films or including elastomeric films, surgical gloves, examination gloves, condoms, catheters or all different kinds of industrial and household gloves. Due to the improved stress retention of the elastomeric films obtained from the polymer latex of the present invention the polymer latex of the present invention is particularly suitable for the preparation of surgical gloves and condoms.

As mentioned above, elastomeric films made from polymer latex compositions comprising the polymer latex of the present invention and an oxirane functional compound can by repaired and recycled.

Method for Repairing an Elastomeric Film or Article Comprising Said Elastomeric Film The present invention also relates to a method for repairing an elastomeric film made from the polymer latex composition of the present invention by
a) providing an elastomeric film made from the polymer latex composition of the present invention that is damaged or an article comprising such a damaged elastomeric film, the damaged elastomeric film having at least surfaces to be reconnected,
b) re-joining the surfaces of the damaged film,
c) heating or annealing the damaged elastomeric film while maintaining intimate contact of the rejoined surfaces of the damaged film at a temperature of 40° C. to 200° C.

Items formed from an elastomeric film are collected and sorted and optionally sterilized for handling purposes. The items where there is damage, but not to the extent that they cannot be re-used, are separated and the surface where there is damage is optionally further cleaned. This cleansing may be by washing with hydrogen peroxide or other sterilizing fluid or by passing under a carbon dioxide air stream or UV light to make sure there are no pathogens present. In the location of damage, the surfaces of the damaged film that have separated from one another are brought together such that they contact one another, for example if there is a hole the edges of the hole are brought into contact and the surface is heated so that the elastomeric film can soften and the surfaces seal together to repair the damage after which the surface is allowed to cool and reveal a repaired or self-healed surface. The heating may be carried out where pressure is applied to the contacting areas of the damaged surface.

Method for Recycling an Elastomeric Film or Article Comprising Said Elastomeric Film The present invention also relates to a method for recycling an elastomeric film made from the polymer latex composition of the present invention or an article comprising such an elastomeric film by cutting, shredding or comminuting said elastomeric film or article to form particles of the elastomer, optionally blending the obtained particles with particles of virgin elastomer, and forming a recycled film or article by subjecting the particles to a pressure of 1-20 MPa and a temperature of 40° C. to 200° C.

Elastomeric materials such as gloves are collected and if necessary, they are sorted so that the nitrile containing materials are collected together while the other material is discarded or sent to alternative recycling or reprocessing facilities. The collected material is then washed and decontaminated if necessary, much like is done for the repairing/self-healing process. The material is then comminuted into particle sizes of not more than 2 mm average diameter, preferably not more than 1 mm average diameter and ideally of diameters in the range of 0.15 to 0.75, more preferably 0.2 to 0.3 average diameter of the particle size. The comminution or grinding process may be carried out at less than room temperature or indeed under cryogenic conditions to enable facile processing and to keep the material as particles before processing further. The cool conditions avoid any re-joining of the particles until needed. The material may be stored at room temperature, or under such conditions that avoid rejoining of the particles until required. The material may be ground further before being fed to a blender where the material is blended with other materials, for example particles of virgin elastomeric material and customary processing aids and additives. If there is no blending step, the material is fed directly to a thermal processing system where the particles/crumb is hot pressed, 2-roll milled, calendered or extruded under pressure and at heated conditions i.e. more than 40 degrees centigrade to allow fluidity in the material as a result of bonds within the material being broken e.g. the bonds within beta hydroxy esters the material and at this stage the material can also be molded into the required final shape. After this the material is cooled, optionally in molds or as part of an extrusion process to produce an end product that is formed from recycled material.

The present invention will be further illustrated with reference to the following examples.

EXAMPLES

Determination of Physical Parameters:

The dispersions were characterized by determination of total solids content (TSC), pH value, viscosity (Brookfield LVT) and z-average particle size. Furthermore, the final films were tested for tensile properties.

Determination of Total Solid Contents (TSC):

The determination of total solids content is based on a gravimetric method. 1-2 g of the dispersion was weighed into a tared aluminum dish, on an Analytical balance. The dish was stored for 1 hour at 120° C. in a circulating air oven until constant mass was reached. After cooling to room temperature, the final weight was then re-determined. The solids content was calculated as follows:

$$TSC = \frac{m_{initial} - m_{final}}{m_{initial}} 100\% \quad (1)$$

where, $m_{initial}$=initial mass of latex,
$m_{final}$=mass after drying

Determination of pH Value:

The pH value was determined according to DIN ISO 976. After applying a 2-point calibration using buffer solutions, the electrode of a Schott CG 840 pH meter was immersed in the dispersion at 23° C. and the constant value on the display was recorded as the pH value.

Determination of Viscosity:

The latex viscosity was determined at 23° C. using a Brookfield LVT viscometer. Approximately 220 ml of the liquid (freed of air bubbles) was filled into a 250 ml beaker and the spindle of the viscometer was immersed up to the mark on the spindle. The viscometer was then switched-on and after approximately 1 minute the value was recorded until it was constant. The viscosity range determines the choice of spindle and rotational speed and the factor for the recorded value to calculate the viscosity. The information regarding spindle and revolutions per minute used are shown in parenthesis in the Examples.

Determination of the Particle Size (PS):

The z-average particle size was measured using a Malvern Zetasizer Nano S (ZEN 1600) employing dynamic light scattering. The latex sample was diluted with deionized water to the turbidity level described in the manual and transferred in the test cuvette. The cuvette was gently mixed to make the sample homogenous and the cuvette was placed in the measurement device. The value was recorded as software generated z-average particle size.

Dipped Film Preparation

Nitrile latex with compounding materials at the desired pH value was stirred for 24 hours unless specified in individual examples below, at room temperature, and then coagulant dipped as follows:

A ceramic spade was washed with soap and then thoroughly rinsed with deionised water before drying in an air-circulating oven set at 65-70° C. (spade temperature, 55-60° C.) until dry.

A solution of coagulant was prepared by dissolving calcium nitrate (18% wt.) and calcium carbonate (2% wt.) in deionised water.

The dry spade was then dipped into the salt solution, removed and then dried in an air-circulating oven set at 70-75° C. (spade temperature, 60-65° C.) until dry. The salt-coated spade was then dipped into the desired, compounded latex (which has total solid content of 18 wt % and matured for 24 hours at room temperature after compounding) for a dwell time of 5 seconds, before removing it and placing the latex-coated spade into an air circulating oven, set at 100° C. for 1 minute, to gel the film.

The thus gelled film was then washed in a tank of deionised water set to 50-60° C. for 1 minute, before curing in an air-circulating oven set to 120° C. for 20 minutes; after which, the thus cured/vulcanised film was cooled, and removed from the spade before aging for 22 hours in an air-circulating oven set to 100° C.

Finally, the cured films were manually stripped from the spade, a typical dried film thickness was 0.056-0.066 mm.

The films prepared from the latexes were tested for their tensile strength properties and stress retention behaviour.

Determination of the Tensile Strength Properties

The tensile properties of the vulcanized films/glove were tested in accordance with ASTM6319, the dumbbell specimens were cut from gloves prepared from each latex compound using a ASTMD412 Type C cutter (width of narrow portion=6 mm, length of narrow portion=33 mm, overall length=115 mm, the thicknesses of the dumbbells are stated in the results Tables) and tested on a Hounsfield HK10KS Tensiometer fitted with H500LC extensometer, at an extension rate of 500 mm/min.

Determination of the Stress Retention Properties

Tensile stress was measured on the dumbbell samples by tensiometer (the same as mentioned above). Stress retention (%) was defined as the ratio (%) of I6/I0×100 where I0 was the initial stress measured immediately after the elongation reached 100% and I6 was the stress measured when the specimen at the elongation of 100% was kept after 6 minutes.

The following abbreviations are used in the Examples:
MAA=Methacrylic acid
Bd=butadiene
ACN=acrylonitrile
tDDM=tert-Dodecyl Mercaptan
Na$_4$EDTA=tetra sodium salt of ethylenediaminetetraacetic acid
TSC=total solid content
PS=particle size
ZnO=zinc oxide
ZDEC=zinc diethyldithiocarbamate
S=Sulphur In the following all parts and percentages are based on weight unless otherwise specified.

Example 1: Preparation of Dip-Coated Film (Control)

2 parts by weight (based on polymer solids) of a seed latex (average particle size 36 nm) and 807 parts by weight of water (based on 100 parts by weight of monomer including the seed latex) were added to a nitrogen-purged autoclave and subsequently heated to 30° C. Then 0.01 parts by weight of Na$_4$EDTA and 0.005 parts by weight of Bruggolite FF6 dissolved in 2 parts by weight of water were added, followed by 0.08 parts by weight of sodium persulfate dissolved in 2 parts by weight of water. Then, the monomers (35 parts by weight of acrylonitrile, 57 parts by weight of butadiene, 6 parts by weight of methacrylic acid), and were added together with 0.6 parts by weight of tDDM over a period of 6 hours. Over a period of 10 hours 2.2 parts by weight of sodium dodecyl benzene sulfonate, 0.2 parts by weight of tetra sodium pyrophosphate and 22 parts by weight of water were added. The co-activator feed of 0.13 parts by weight of Bruggolite FF6 in 8 parts by weight of water was added over 9 hours. The temperature was maintained at 30° C. up to a conversion of 95%, resulting in a total solids content of 45%. The polymerization was short-stopped by addition of 0.08 parts by weight of a 5% aqueous solution of diethylhydroxylamine. The pH was adjusted using potassium hydroxide (5% aqueous solution) to pH 7.5 and the residual monomers were removed by vacuum distillation at 60° C. 0.5 parts by weight of a Wingstay L type antioxidant (60% dispersion in water) was added to the raw latex, and the pH was adjusted to 8.2 by addition of a 5% aqueous solution of potassium hydroxide.

The following characterization results were obtained for Example 1:
TSC=45.0 wt. %
pH=8.2

Tg=−15° C.
Viscosity=30.5 mPas (1/60)
Particle size, $P_z$=120 nm

A dry, salt-coated spade was dipped into the diluted compounded latex solution with 18% TSC comprising of 0.8 phr S, 0.7 phr ZDEC, 1 phr ZnO and titanium dioxide at pH 10 with a dwell time of 5 seconds before the film was gelled at 100° C. for 1 minute, washed with deionised water for 1 minute (in a tank set at 50-60° C.) for 1 minutes, followed by drying and curing/vulcanisation in an air-circulating oven set at 120° C. for 20 minutes, to ensure complete drying and crosslink formation.

The tensile and stress retention properties are shown in Table 1 below.

Example 1a

Example 1 was repeated with the exception that dipping was performed as follows.

A dry, salt-coated spade was dipped into the diluted compounded latex solution with 18% TSC comprising of 1.5 phr S, 1.2 phr ZDEC, 0.9 phr ZnO and titanium dioxide at pH 10 with a dwell time of 5 seconds before the film was gelled at 100° C. for 3 minutes, washed with deionised water for 1 minute (in a tank set at 50-60° C.) for 1 minutes, followed by drying and curing/vulcanisation in an air-circulating oven set at 120° C. for 20 minutes, to ensure complete drying and crosslink formation. The tensile and stress retention properties are shown in Table 1 below.

Example 2: (10% Replacement of MAA)

The composition was prepared in the same manner as in Example 1 except that 5.4 part of methacrylic acid and 0.6 parts of Sipomer® β-CEA a mixture of 2-carboxyethyl acrylate oligomers commercially available as from Solvay (Belgium) were used.

Example 3: (20% Replacement of MAA)

The composition was prepared in the same manner as in Example 1 except that 4.8 part of methacrylic acid and 1.2 parts of Sipomer® β-CEA were used.

Example 4: (30% Replacement of MAA)

The composition was prepared in the same manner as in Example 1 except that 4.2 part of methacrylic acid and 1.8 parts of Sipomer® β-CEA were used.

Example 5: (40% Replacement of MAA)

The composition was prepared in the same manner as in Example 1 except that 3.6 part of methacrylic acid and 2.4 parts of Sipomer® β-CEA were used.

Example 6: (100% Use of 2-carboxyethyl Acrylate Oligomers)

The composition was prepared in the same manner as in Example 1 except that no methacrylic acid was used and 6 parts of Sipomer® β-CEA was used.

Example 6a (100% use of 2-carboxyethyl Acrylate Oligomers)

The composition was prepared in the same manner as in Example 1a except that no methacrylic acid was used and 6 parts of Sipomer® β-CEA was used.

Example 7: (100% use of 2-carboxyethyl Acrylate Oligomers, with Compounding Recipe V1)

The composition was prepared in the same manner as in Example 1 except that no methacrylic acid was used and 6 parts of Sipomer® β-CEA was used. Also, the compounding latex formulation comprises of 0.9 phr ZnO, 1.5 phr S and 1.2 phr ZDEC.

Example 8: (100% Use of 2-carboxyethyl Acrylate Oligomers, with Compounding Recipe V1 with Longer Curing Time)

The composition was prepared in the same manner as in Example 1 except that no methacrylic acid was used and 6 parts of Sipomer® β-CEA was used. Also, the compounding latex formulation comprises of 0.9 phr ZnO, 1.5 phr S and 1.2 phr ZDEC. Curing/vulcanization was carried out for 35 minutes instead of 20 minutes.

Example 9 (100% Use of 2-acryloyloxyethyl Succinate)

The composition was prepared in the same manner as in Example 1a except that no methacrylic acid was used and 6 parts of 2-acryloyloxyethyl succinate was used.

TABLE 1

| | Thickness (mm) | Tensile strength (MPa) | Elongation at break (%) | Stress at 500% strain (MPa) | Stress retention (%) |
|---|---|---|---|---|---|
| Example 1 (control) | 0.060 | 35.2 | 572 | 20.5 | 34.7 |
| Example 1a (control | 0.160 | 45.3 | 495 | n.d. | 43.4 |
| Example 2 | 0.061 | n.d. | n.d. | n.d. | 35.9 |
| Example 3 | 0.064 | n.d. | n.d. | n.d. | 36.9 |
| Example 4 | 0.062 | n.d. | n.d. | n.d. | 39.1 |
| Example 5 | 0.062 | 31.9 | 602 | 13.3 | 41.5 |
| Example 6 | 0.063 | 15.6 | 890 | 2.7 | 50.0 |
| Example 6a | 0.188 | 23.8 | 771 | 3.54 | 65.5 |
| Example 7 | 0.064 | 19.2 | 813 | 2.1 | 52.4 |
| Example 8 | 0.062 | 20.9 | 710 | 2.4 | 60.1 |
| Example 9 | 0.187 | 23.0 | 747 | 3.62 | 66.8 |

Example 10: (Control, Glove with High Thickness)

This was an exact repeat of Example 1.

Example 11: (100% 2-carboxyethyl Acrylate Oligomers, Gloves with High Thickness, Curing Time 35 Min, Compounding Recipe V1)

The composition was prepared in the same manner as in Example 1 except that no methacrylic acid was used and 6 parts of Sipomer® β-CEA was used. Also, the compounded latex was not diluted, and compounding formulation comprises of 0.9 phr ZnO, 1.5 phr S and 1.2 phr ZDEC. Curing/vulcanization was carried out for 35 minutes instead of 20 minutes.

Example 12: (100% 2-carboxyethyl Acrylate Oligomers, Gloves with High Thickness, Curing Time 40 Min, Compounding Recipe V1)

The composition was prepared in the same manner as in Example 1 except that no methacrylic acid was used and 6 parts of Sipomer® β-CEA was used. Also, the compounded latex was not diluted, and compounding formulation comprises of 0.9 phr ZnO, 1.5 phr S and 1.2 phr ZDEC. Curing/vulcanization was carried out for 40 minutes instead of 20 minutes.

Example 13: (100% 2-carboxyethyl Acrylate Oligomers, Gloves with High Thickness, Curing Time I 50 Min, Compounding Recipe V1)

The composition was prepared in the same manner as in Example 1 except that no methacrylic acid was used and 6 parts of Sipomer® β-CEA was used. Also, the compounded latex was not diluted, and compounding formulation comprises of 0.9 phr ZnO, 1.5 phr S and 1.2 phr ZDEC. Curing/vulcanization was carried out for 50 minutes instead of 20 minutes.

The tensile and stress retention properties of examples 8-12 are shown in Table 2 below.

TABLE 2

| | Thickness | Tensile strength (MPa) | Elongation at break (%) | Stress at 500% strain | Stress retention (%) |
|---|---|---|---|---|---|
| Example 10 (control) | 0.179 | 47.4 | 531 | 39.3 | 38.6 |
| Example 11 | 0.219 | 20.5 | 687 | 4.7 | 65.7 |
| Example 12 | 0.217 | 20.0 | 690 | 4.7 | 64.4 |
| Example 13 | 0.219 | 21.2 | 661 | 5.3 | 64.9 |

Example 14: (Control with 48 Hours Maturation Time)

The composition was prepared in the same manner as in Example 1 except that the compounded latex was stirred for 48 hours instead of 24 hours at room temperature before dipping was carried out.

Example 15: (100% 2-carboxyethyl Acrylate Oligomers, Curing Time 35 Min, Compounding Recipe V2)

The composition was prepared in the same manner as in Example 1 except that no methacrylic acid was used and 6 parts of Sipomer® β-CEA was used. Also, the compounding latex formulation comprises of 0.3 phr ZnO, 2 phr S and 0.5 phr ZDEC. The compounded latex was stirred for 48 hours (hrs) instead of 24 hours (hrs) at room temperature before dipping was carried out. Curing/vulcanization was carried out for 35 minutes instead of 20 minutes.

Example 16: (100% 2-carboxyethyl Acrylate Oligomers, Curing Time 35 Min, Compounding Recipe V3)

The composition was prepared in the same manner as in Example 1 except that no methacrylic acid was used and 6 parts of Sipomer® β-CEA was used. Also, the compounding latex formulation comprises of 0.3 phr ZnO, 2 phr S and 1 phr ZDEC. The compounded latex was stirred for 48 hours instead of 24 hours at room temperature before dipping was carried out. Curing/vulcanization was carried out for 35 minutes instead of 20 minutes.

The tensile and stress retention properties of examples 13 to 15 are shown in Table 3 below.

TABLE 3

| | Thickness (mm) | Tensile strength (MPa) | Elongation at break (%) | Stress at 500% strain | Stress retention (%) |
|---|---|---|---|---|---|
| Example 14 (control) | 0.060 | 40.0 | 502 | 38.3 | 35.5 |
| Example 15 | 0.067 | 22.8 | 750 | 3.9 | 55.2 |
| Example 16 | 0.067 | 26.9 | 669 | 6.4 | 63.2 |

The invention claimed is:

1. A polymer latex composition for preparation of an elastomeric film comprising a polymer latex obtained by free-radical emulsion polymerization of a mixture of ethylenically unsaturated monomers comprising:
   a) 15 to 99 wt.-% of conjugated dienes;
   b) 0 to 80 wt.-% of ethylenically unsaturated nitrile compounds;
   c) 0 to 70 wt.-% of vinyl aromatic monomers, the sum of ethylenically unsaturated nitrile compounds b) and vinyl aromatic monomers c) being 0.95 to 84.95 wt.-%;
   d) 0.05 to 10 wt.-% of ethylenically unsaturated acids wherein the ethylenically unsaturated acids comprise
      d1) an ethylenically unsaturated acid comprising
         an acid functional group; and
         a spacer group separating the ethylenically unsaturated group and the acid functional group by at least 4 atoms,
         wherein the acid functional group is selected from carboxylic acid groups and phosphorous-containing acid groups; and
   e) 0 to 65 wt.-% of co-polymerizable ethylenically unsaturated compounds,
   wherein monomers a) to e) are different from each other and the weight percentages are based on the total monomers in the mixture,
   wherein monomer d) comprises an ethylenically unsaturated carboxylic acid,
   wherein the composition further comprises an oxirane functional compound, and
   wherein the ethylenically unsaturated acid of d1) is the sole ethylenically unsaturated acid in the mixture of ethylenically unsaturated monomers.

2. The polymer latex composition according to claim 1, wherein d1) is selected from compounds having the structure:

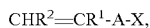

wherein:
R$^1$ is selected from H and C$_1$-C$_4$ alkyl,
R$^2$ is selected from H or -A-X;
A is a divalent spacer group separating the ethylenically unsaturated group and the functional group X by at least 4 atoms independently at each occurrence selected from:

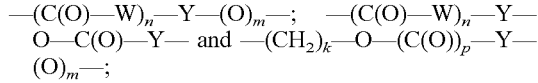

n, m, k and p are integers independently at each occurrence selected from 0 or 1;

W is —O— or —NR$^3$—;

R$^3$ is selected from H and C$_1$-C$_4$ alkyl;

Y is independently at each occurrence selected from optionally substituted linear, branched, cyclic or aromatic C$_2$ to C$_{30}$ divalent hydrocarbon or hetero hydrocarbon groups;

X is selected from —C(O)OH and —P(O)(OH)$_2$;

with the proviso that if X is —C(O)OH, m is 0;

or -A-X is selected from —C(O)—O—(Y—C(O)—O)$_l$—H, wherein l is an integer from 2 to 10, and mixtures thereof.

3. The polymer latex composition according to claim 1, wherein the ethylenically unsaturated acid of d1) is present from 0.1 to 9 wt.-%, based on the total monomers in the mixture.

4. The polymer latex composition according to claim 1, wherein:
   a) the conjugated dienes are selected from butadiene, isoprene, 2,3-dimethyl-1,3-butadiene, 2-ethyl-1,3-butadiene, 1,3-pentadiene, myrcene, ocimene, farnasene and combinations thereof,
   b) the ethylenically unsaturated nitrile compounds are selected from (meth)acrylonitrile, alpha-cyanoethyl acrylonitrile, fumaronitrile, alpha-chloronitrile and combinations thereof;
   c) the vinyl aromatic monomers are selected from styrene, alpha-methyl styrene, vinyl toluene and combinations thereof; and
   e) the co-polymerizable ethylenically unsaturated compounds are selected from
      e1) alkyl esters of ethylenically unsaturated acids;
      e2) hydroxyalkyl esters of ethylenically unsaturated acids;
      e3) amides of ethylenically unsaturated acids;
      e4) vinyl carboxylates;
      e5) alkoxyalkyl esters of ethylenically unsaturated acids;
      e6) monomers having at least two ethylenically unsaturated groups;
      e7) ethylenically unsaturated silanes and combinations thereof.

5. The polymer latex composition according to claim 1, wherein the mixture of ethylenically unsaturated monomers for the polymer latex comprises:
   a) 20 to 98 wt.-% of conjugated dienes;
   b) 1 to 60 wt.-% of ethylenically unsaturated nitrile compounds;
   c) 0 to 40 wt.-% of vinyl aromatic monomers;
   d) 1 to 8 wt.-% of ethylenically unsaturated acids;
   e1) 0 to 25 wt.-% of C$_1$ to C$_8$ alkyl (meth)acrylates;
   e3) 0 to 10 wt.-% of amides of ethylenically unsaturated acids;
   e4) 0 to 10 wt.-% of vinyl esters; and
   e7) 0 to 10 wt.-% of ethylenically unsaturated silanes,
   the weight percentages being based on the total monomers in the mixture.

6. A method for coating or impregnating a substrate, comprising contacting the substrate with the polymer latex according to claim 1.

7. The polymer latex composition according to claim 1, wherein the oxirane functional compound is selected from
   i) a latex polymer;
   ii) monomeric or oligomeric compounds comprising at least two oxirane functional groups; and
   iii) monomeric compounds, oligomeric or polymeric compounds that are not prepared by free-radical addition polymerization bearing at least one oxirane group and a functional group different from an oxirane group, the functional groups different from an oxirane group on different molecules of compound iii) are capable of reacting with each other.

8. The polymer latex composition according to claim 1, wherein the carboxylic acid functional latex polymer and the oxirane functional compound are present in relative amounts to provide a molar ratio of oxirane groups to carboxylic acid groups from 0.1 to 2.

9. A compounded latex composition suitable for the production of dip-molded articles comprising the polymer latex composition according to claim 1 and adjuvants selected from sulfur vulcanization agents, accelerators for sulfur vulcanization, crosslinkers, polyvalent cations and combinations thereof.

10. The compounded latex composition according to claim 9, comprising 0 to 2.8 wt.-% of sulfur vulcanization agents and 0.5 wt.-% to 2.5 wt.-% of ZnO the weight percentages being based on solid latex polymer.

11. A method for making dip-molded articles by
   a) providing a compounded latex composition of claim 9;
   b) immersing a mold having the desired shape of the final article in a coagulant bath comprising a solution of a metal salt;
   c) removing the mold from the coagulant bath and optionally drying the mold;
   d) immersing the mold as treated in step b) and c) in the compounded latex composition of step a);
   e) coagulating a latex film on the surface of the mold;
   f) removing the latex-coated mold from the compounded latex composition and optionally immersing the latex-coated mold in a water bath;
   g) optionally drying the latex-coated mold;
   h) heat treating the latex-coated mold obtained from step e) or f) at a temperature of 40° C. to 180° C.; and
   i) removing the latex article from the mold.

12. The method of claim 11, wherein after step a) and prior to step d) the compounded latex composition is matured for at least 3 hrs.

* * * * *